(12) United States Patent
Ergan et al.

(10) Patent No.: US 8,776,027 B2
(45) Date of Patent: Jul. 8, 2014

(54) EXTRACTING AND COLLECTING PLATFORM USE DATA

(75) Inventors: Cenk Ergan, Bellevue, WA (US); Justin Steventon, Kirkland, WA (US); Eric Kochhar, Mercer Island, WA (US); Udayasimha Shivaswamy, Sammamish, WA (US); Douglas R. Earhart, Seattle, WA (US); Micah Brodsky, Boston, WA (US)

(73) Assignee: Microsoft Corporation, Redmond, WA (US)

( * ) Notice: Subject to any disclaimer, the term of this patent is extended or adjusted under 35 U.S.C. 154(b) by 1164 days.

(21) Appl. No.: 12/399,491

(22) Filed: Mar. 6, 2009

(65) Prior Publication Data

US 2010/0229157 A1 Sep. 9, 2010

(51) Int. Cl.
*G06F 9/44* (2006.01)

(52) U.S. Cl.
USPC ............ 717/127; 717/120; 717/130; 717/131

(58) Field of Classification Search
None
See application file for complete search history.

(56) References Cited

U.S. PATENT DOCUMENTS

| | | | |
|---|---|---|---|
| 6,442,753 B1 | 8/2002 | Gerard et al. | |
| 6,557,120 B1 * | 4/2003 | Nicholson et al. | 714/38.13 |
| 6,996,832 B2 | 2/2006 | Gunduc et al. | |
| 7,076,765 B1 | 7/2006 | Omori | |
| 7,140,013 B2 | 11/2006 | Te'eni et al. | |
| 7,225,430 B2 * | 5/2007 | Eatough et al. | 717/127 |
| 7,325,166 B2 * | 1/2008 | Maguire | 714/38.11 |
| 7,797,245 B2 * | 9/2010 | Pedersen | 705/59 |
| 7,925,635 B1 * | 4/2011 | Ravulur et al. | 707/688 |
| 7,979,898 B2 * | 7/2011 | Zarenin et al. | 726/7 |
| 8,171,551 B2 * | 5/2012 | Muttik et al. | 726/24 |
| 2002/0026631 A1 * | 2/2002 | Barritz | 717/127 |
| 2003/0233645 A1 | 12/2003 | Cohen et al. | |
| 2004/0199827 A1 * | 10/2004 | Muttik et al. | 714/38 |

(Continued)

OTHER PUBLICATIONS

Funk, M., et al., Semantic Concepts in Product Usage Monitoring and Analysis, ES Reports, Sep. 29, 2008, 20 pages, [retrieved on Feb. 22, 2014], Retrieved from the Internet: <URL:http://www.es.ele.tue.nl/esreports/esr-2008-10.pdf>.*

(Continued)

*Primary Examiner* — Thuy Dao
*Assistant Examiner* — Geoffrey St Leger
(74) *Attorney, Agent, or Firm* — John Jardine; Andrew Sanders; Micky Minhas

(57) ABSTRACT

A system for reporting information about how selected components of an operating system are used by applications on a computing device. A manifest of components is provided from a management server to a computing device. The manifest specifies components of the operating system for which usage information is to be collected. The computing device surveys applications for calls to the components specified in the manifest. Surveys may be performed by static scanning and/or dynamic monitoring. In static scanning, application files are scanned for keyword strings specified in the manifest. Keyword string matches are recorded to a log file. In dynamic monitoring, calls from executing applications to components specified by the manifest are identified and logged. A report is generated from the log and sent to the management server. The management server then aggregates and analyzes reports from multiple computing devices to enable developers to assess how the components are being used.

14 Claims, 7 Drawing Sheets

(56) References Cited

U.S. PATENT DOCUMENTS

| | | | |
|---|---|---|---|
| 2005/0289404 A1* | 12/2005 | Maguire | 714/57 |
| 2006/0107256 A1* | 5/2006 | Zarenin et al. | 717/127 |
| 2006/0112375 A1* | 5/2006 | Schneider | 717/131 |
| 2006/0282827 A1* | 12/2006 | Yeap et al. | 717/130 |
| 2007/0143735 A1 | 6/2007 | Clemm et al. | |
| 2007/0261030 A1* | 11/2007 | Wadhwa | 717/127 |
| 2008/0059946 A1 | 3/2008 | Harding et al. | |
| 2008/0092136 A1 | 4/2008 | Pullara | |
| 2008/0163187 A1 | 7/2008 | Loff | |
| 2008/0196024 A1 | 8/2008 | Barfield et al. | |
| 2008/0295065 A1 | 11/2008 | Hawkins et al. | |
| 2009/0125885 A1* | 5/2009 | Gayathri et al. | 717/120 |
| 2010/0199264 A1* | 8/2010 | Maeda | 717/127 |

OTHER PUBLICATIONS

Hilbert, D., et al., An Approach to Large-Scale Collection of Application Usage Data Over the Internet, Proceedings of the 1998 International Conference on Software Engineering, 1998, pp. 136-145, [retrieved on Feb. 22, 2014], Retrieved from the Internet: <URL:http://ieeexplore.ieee.org/>.*

Nagappan et al., "Using Software Dependencies and Churn Metrics to Predict Field Failures: An Empirical Case Study," *IEEE*, pp. 364-373 (2007) http://ieexplore.ieee.org/stamp/stamp.jsp?arnumber=04343764.

* cited by examiner

EXTRACTING AND COLLECTING PLATFORM USE DATA

BACKGROUND

Operating systems contain features that collect information that can aid in improving the operating system or applications that execute on the operating system. For example, the WINDOWS® operating system available from Microsoft Corporation of Redmond, Wash., USA, contains an error reporting service. When the operating system detects a problem with an application, the operating system may offer a user of a computer on which the application was running an opportunity to send a report of the error. If the user consents, data characterizing operation of the computer leading up to the crash may be sent to a server.

The report may contain information relating to execution state of the computer or operating system at the time the error occurred. For example, the report may identify information about the last instruction executed within a process at the time the error occurred. Additionally, some components of an operating system may be instrumented with "hooks" that make an entry in a log file whenever those components are called. All or portions of this log file may be used as part of an error report to provide information about events on the computer leading up to the error.

At the server, reports received from multiple computing devices may be aggregated and studied to identify operating scenarios that give rise to problems. These problems can then be corrected, improving the overall usefulness of the operating system for executing applications.

Operating systems may also include a feature to collect information on usage of software components. To collect this information, software components may be "instrumented." At various locations within software, a function or other mechanism is inserted so that, when that instrumentation point is reached during execution of the software, the function logs an event. Log files created on multiple computers can also be collected at a server. By analyzing the logged events in these files, information useful in making decision about maintenance or development of software may be learned. For example, analysis of the log files may indicate the frequency of use of specific software components or specific functions of those components.

SUMMARY

By providing a system to collect information about use of platform components, platform developers have access to information that can provide better versions of the platform. The system can be configured to collect information on any of a number of platform components, and the specific components on which information is gathered can be specified at any time during the lifecycle of the platform.

Usage data can be collected even on components that are not specifically instrumented for collecting usage information. As a result, usage information can be collected long after a platform is deployed, allowing data to be collected for making decisions about whether specific components are still sufficiently in use to warrant allocation of resources to maintain or improve those components (among other decisions). In this way, development resources can be focused on components that provide the most benefit to users of the platform. Similarly, when a platform is being ported to different environment or target application, usage information can allow informed choices about which components are important to include in the target platform environment.

As applied to a platform, such as an operating system (OS), the system surveys consenting users' computing devices for use of components of an OS by applications on the device. Data on usage of those components may then be forwarded to a sever at a central location where usage information is aggregated and analyzed to determine usage (patterns/trends/hot spots).

The specific components for which usage information is to be collected may be specified even after the operating system is deployed. A management server may distribute a manifest of components to the computing devices. The manifest specifies components of the operating system for which survey data is to be collected. After a computing device has received the manifest, it may begin surveying how applications are using the components specified in the manifest. In some embodiments, components may be surveyed statically and/or dynamically.

A static survey may be performed by scanning application files for indications that computer-executable instructions in those files call components specified in the manifest. A dynamic survey may be performed by inserting a hook between the operating system and a process or processes in which applications are executing. The hook inspects calls from the applications to components of the operating system. Usage of a component is detected when the hook identifies a call to a component of the operating system specified by the manifest. The manifest may specify components individually or by indicating a category of components or in any other suitable way.

The component usage information collected through static and dynamic surveys may be prepared into a report, which can be sent to the management server or other centralized location. The management server may aggregate the reports received from multiple computing devices. The aggregated reports may then be analyzed to assess manner or frequency of use of the components. For example, analysis may be performed to determine how widely certain operating system components are being used or which applications use certain components.

The foregoing is a non-limiting summary of the invention, which is defined by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
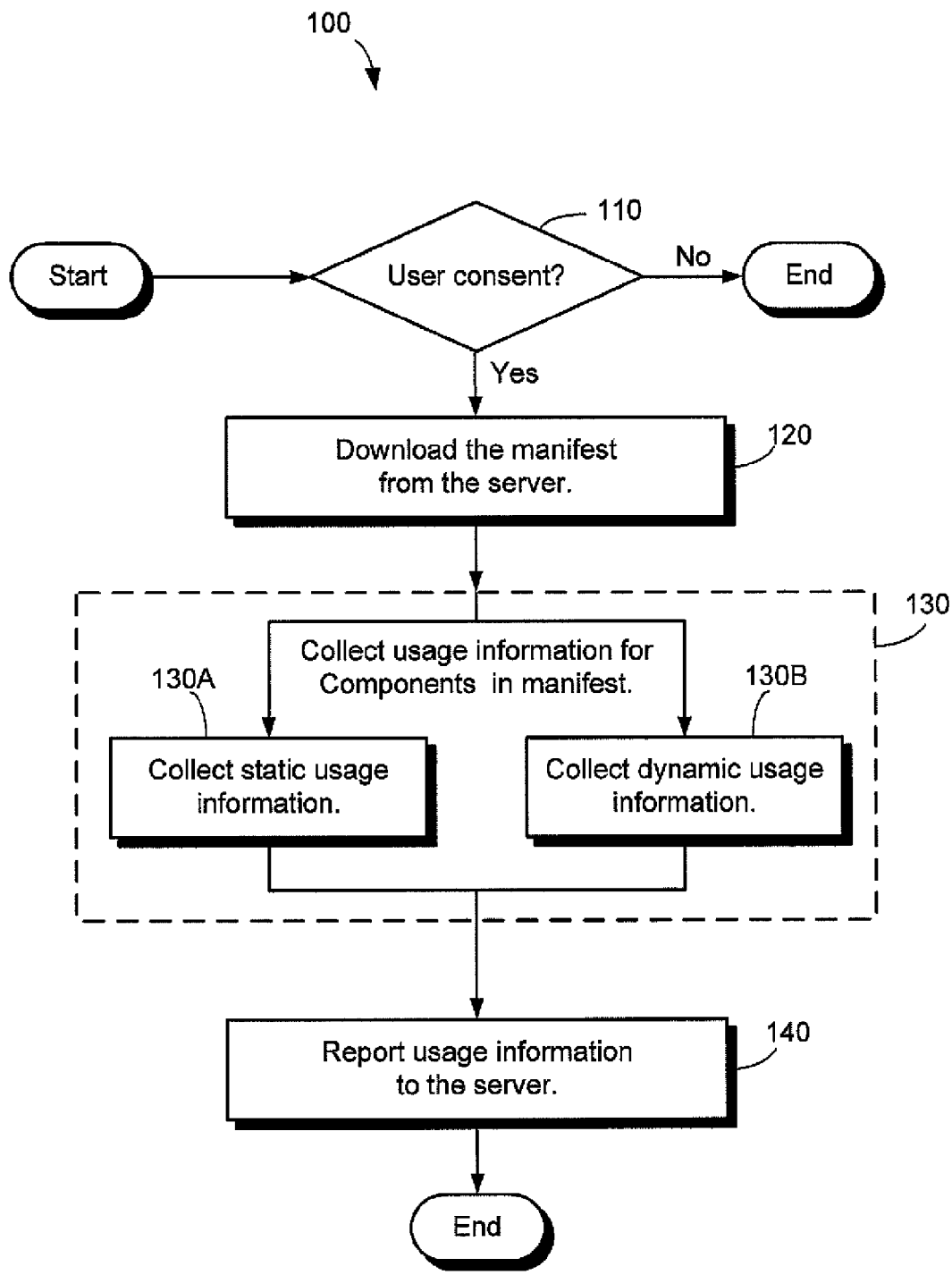
FIG. 1A is a flow chart of a method for collecting and reporting usage information according to some embodiments.

The inventors have recognized and appreciated that existing systems for collecting data on software executing on computing devices, while useful in providing data relating to corrections to programs, do not provide data that is useful in other scenarios. Such systems provide useful data for identifying bugs in application programs, but provide less information about the platform on which those applications execute. They also provide little information that can be used to make life cycle decisions about which components to support, makes obsolete or where to focus development resources.

A platform, such as an operating system (OS), may include components that are used by applications running in the OS environment to interface with the OS and instruct it to perform certain functions. Once deployed, these components must be maintained to ensure that applications in use on computers executing the operating system continue to function as expected.

Thus, even as the OS grows and is adapted to provide new functionality by adding new components, older components may still be updated. Nonetheless, it would often be desirable to remove from the operating system components that are redundant, rarely used or obsolete. Accordingly, operating system developers must weigh the risks and benefits of any proposed changes to the OS, including making decisions about allocation of resources to providing new components or maintaining older components.

The inventors have recognized and appreciated that a platform, such as an operating system, could be improved if developers had information about actual usage of the platform's components at any stage in the lifecycle of the platform, even if the components were not specifically instrumented to support collection of data about use.

As described herein a system for assessing usage of components of an operating system can be provided by collecting from computers of consenting users information about what components of the operating system are being used by the applications they run. The inventors have further recognized that by collecting information at variable sampling rates from many users, this information can be collected at low rates with an imperceptible cost to most users. In other scenarios, the information can be collected at high rates in order to quickly obtain large amounts of information. At the same time, the information collected will be statistically significant and will help platform developers decide how to move a platform forward.

The system can collect information about usage of components that may be specified after the operating system is deployed. In some embodiments, the information is collected at a central location as multiple user computers send usage information reports about components. The specific components for which data is collected may be defined at the time data is to be collected, allowing the system to collect data on platform components that are not specifically instrumented for data collection. Because the components for which data are collected can be specified, the system can be used to collect data at any stage of the lifecycle of a platform, such as when decisions need to be made about which components to carry forward into new versions of the platform.

To specify components to monitor, a management server provides consenting users' computing devices with a manifest that indicates the components of the platform for which usage data is desired. The computing devices collect information about usage of components within the platform, including which applications called the components identified in the manifest and the frequency at which those calls are made, and report the information back to the management server. The information is then aggregated at the management server. The aggregated information is analyzed and provided to the developers to assist them in assessing the use of components in the platform.

In the exemplary embodiments described herein, the platform is computer operating system (OS). FIG. 1A shows a flow chart of an exemplary method 100 for surveying how components of an operating system specified by a manifest are being used on a computing device. The survey produces a report containing usage data for the specified components. A process as illustrated in FIG. 1A may be performed on computers of multiple users. The process may be repeated on each user's computer periodically or at random intervals. Though, it is not necessary that the process be performed continuously on any single computer. Rather, the process may be repeated on a sufficient number of user computers at sufficient intervals to gather sufficient data to provide a meaningful representation of actual usage.

At step 110, consent is obtained from the user of the computing device to collect usage data. If the user does not consent, the method 100 ends and usage data is not collected. If user consent is obtained, the method 100 continues to step 120.

At step 120, a manifest is downloaded from a management server to the computing device. The manifest specifies a subset of the components of the operating system running on the computing device which are to be surveyed on the computing device. Components may be identified explicitly or by a category. For example, files, application programming interfaces (APIs), dynamically linked libraries, or any other type of uniquely identifiable component may be specified in the manifest. The manifest may specify a sampling rate for each component for determining how frequently events associated with component usage are recorded for the comportment. The manifest may specify sampling rates for components individually or may specify sampling rates in other ways, such as specifying a sampling rate for a category of components, such as "all APIs." The sampling rate for a category of components may be used for sampling a component in the category when a specific sampling rate has not been defined for the component. In some embodiments, the components are associated with component identifiers for identification purposes. For example, a component may be identified by a globally unique identifier (GUID). Though, any suitable mechanism for indicating components may be employed. For example, the components may alternatively or additionally be identified based on strings or other constructs in application program indicating that the component likely is being called. Thus, identification of a component may include a keyword dictionary, list or trie. It should be appreciated that the components specified in the manifest may be limited to a subset of the components of the operating system. For example, the manifest may designate 50, 100, or any other suitable number of components or categories for surveying. In some embodiments, the manifest may specify components or categories of components which are not to be surveyed. For example, a category may be set to 0% sampling rate, and a specific component, which falls in that category, may be set to a non-zero sampling rate.

In some embodiments, the manifest is marked with an expiration date as a way to limit the amount of resources that a user computer spends on collecting and transmitting usage information. For example, if the expiration date has passed, the manifest may be ignored or deleted. Additionally, the manifest may be marked with a version number. A user computer may access the management server to check for a newer version of the manifest, which may be downloaded to replace the manifest. In some other embodiments, the expiration date is assumed to be a fixed amount of time after a particular date associated with the manifest. For example, the expiration may be six months after the manifest became available for download. In yet some other embodiments, the manifest is considered valid until a new manifest becomes available for download. The period of time for which a manifest is available and current and the manner in which a user computer determines whether to collect usage information as specified in a manifest is not critical to the invention and any suitable approaches may be used.

At step 130, usage information is collected for the components in the manifest by surveying applications and processes on the computing device. For example, independently developed "third party" applications may be surveyed. Though any suitable application may be surveyed. In some embodiments, applications are surveyed statically and/or dynamically according to steps 130A and 130B, respectively. Any combination of static and dynamic surveys may be performed. Though, surveying may be performed in any suitable way.

Static surveying is performed at step 130A by analyzing application files on the computing device for indications that they contain calls to components specified in the manifest. In some embodiments, calls are identified by scanning the file for strings that match keyword strings in the manifest. The manifest may be organized into a trie structure. A trie is a type of data structure known in the art for storing a dictionary of strings and is organized in a way that facilitates fast searching. Regardless of how the keyword strings are stored, when a match is found, a record of that usage may be made. For example, a log may be updated with usage information indicating that a match to the keyword string occurred.

Dynamic, or runtime, surveying is performed at step 130B by surveying an executing application or process for calls to any of the components identified in the manifest. Dynamic surveying may be performed by inserting instrumentation points into the code of an application to be executed. The choice of instrumentation points to be added to an application may be determined in any suitable way. For example, instrumentation points may be determined from the manifest. When the instrumentation point is hit in the executing code, an indication of the hit along with information about the application are recorded to a log file. For example, an ID of the instrumentation point, a path and image header hash for the application may be logged.

Dynamic surveying may also be performed by inserting a hook at the boundary between the application and operating system to monitor the application for component calls. For example, the hook may be implemented as a shim. A shim is a set of computer-executable instructions that mimics the interfaces an operating system presents to an application that makes calls to the operating system. The shim is integrated into the system such that the application calls the shim rather than the operating system component. The shim performs operations based on the call, including forwarding the call to the intended operating system component before or after performing some operation based on the call. In this case, the shim inspects calls from the application to the operating system and records information about usage of operating system components. As one example, when a call from the application is made to a component specified in the manifest, a log is updated with usage information indicating the application called the particular component in the manifest.

Step 130 may proceed continuously or intermittently for any suitable time period or until a particular event or combination of events occurs. Surveying may continue, for example and not limitation, until the manifest expires, until each application file to be scanned has been fully scanned, until a dynamically monitored application is terminated, a trigger is received from the management server, or based on any other detectable event or combination of events. After the surveying step is completed, the method 100 proceeds to step 140.

At step 140, the usage information is reported to the management server. In some embodiments, before the usage information is sent, the log files are processed to prepare a report containing usage information. The report may be prepared, for example, by compressing and/or down sampling the log files.

Figure 1B:
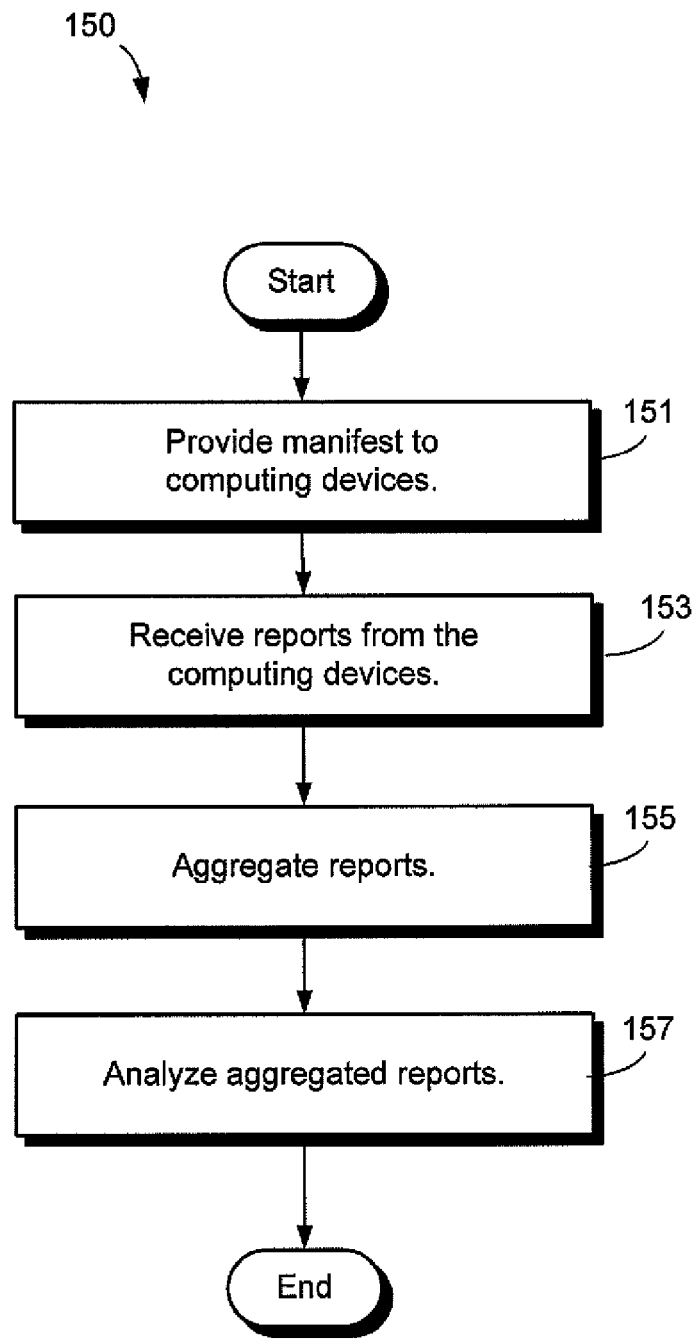
FIG. 1B is a flow chart of a method for aggregating and analyzing reports at a management server according to some embodiments.

Method 100 may be performed by multiple computing devices in a system such that the collected data constitutes a statistically significant representation of actual usage of components for the deployed operating system. FIG. 1B shows a flow chart of a method 150 which may be performed by a management server to provide analyzed component usage information.

At step 151, a manifest is made available for download to a group of computing devices. The specific mechanism by which this download is initiated and performed is not critical to the invention. In some embodiments the management server notifies the computing devices that the manifest is available. Alternatively or additionally, the manifest may be promptly sent to the consenting users' computing devices. In some other embodiments, the management server waits for queries or requests from a computing device to provide the new manifest. For example, a computing device may request the manifest or query the management server to determine if a manifest is available and, if applicable, when it expires and/or its version.

At step 153, reports containing usage information of the components in the manifest are received from the group of computing devices. For example, the reports may be uploaded from the computing devices to the management server. For simplicity of illustration, the management server providing the manifest and collecting usage reports is shown as the same server. Though, it should be appreciated that there is no requirement for such an architecture and the functions of providing a manifest and collecting data may be done on the same or different devices.

After the reports have been received, at step 155 the reports are aggregated. The reports may be aggregated in any suitable way. For example, the reports may be combined into a single report or integrated into a database. In some embodiments, redundant information is removed during aggregation. By combining data from multiple user computers, the aggregated information can provide a more accurate indication of usage of specified components of the operating system as deployed.

At step 157, the aggregated reports are analyzed. In some embodiments, statistical information about the use of the components in the manifest is generated. The analysis may be performed by a set of queries on the aggregated reports. For example, statistics indicating overall use of each component, use of components by a particular application, correlated use of components as a set, adoption and abandonment of component use over time, application characteristics as a predictor of component use, component use as a predictor of application characteristics, and how widely used or installed a particular application is may be generated. The results of the analysis may be provided to developers to assist them in assessing how to move the operating system platform forward in future releases.

Figure 2:
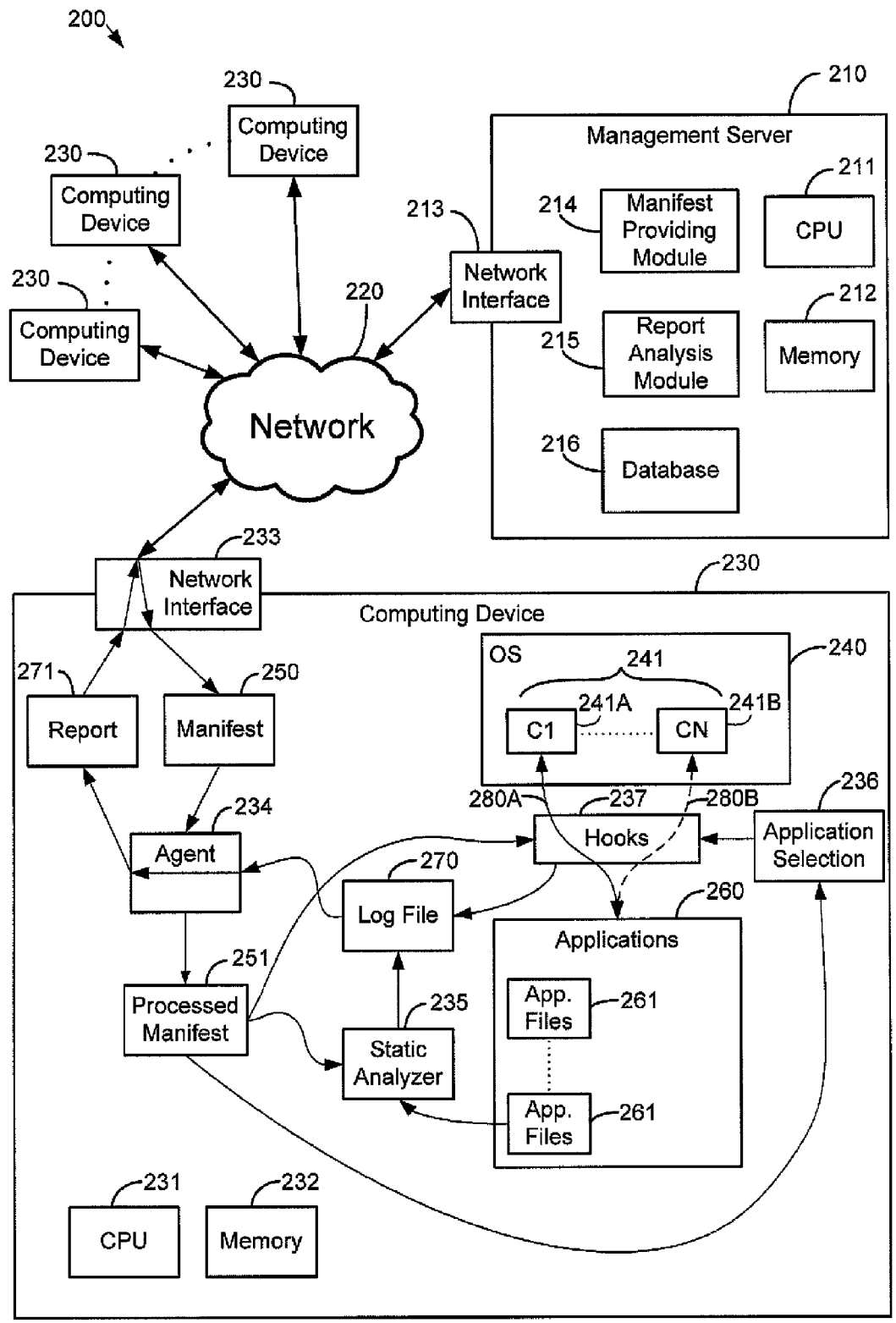
FIG. 2 is a block diagram of a system for collecting and reporting information about how components specified in a manifest are being used according to some embodiments.

FIG. 2 is a block diagram of an exemplary system 200 for collecting usage information from computing devices 230. The system includes a management server 210, a network 220 and any suitable number of computing devices 230. Here, for simplicity, four user computing devices 230 are illustrated. Also for simplicity, the computing devices are illustrated to be of the same type. In an actual environment in which an operating system is deployed, there may be many more computing devices and the computing devices may be of multiple types. Accordingly, it should be appreciated that the invention is not limited by number or type of computing devices in the environment in which it is used.

The management server 210 is configured to supply a manifest 250 over the network 220 to each of the computing devices 230. The management server 210 may provide the manifest 250 as part of an updating service. For example, the manifest may be downloaded as part of Windows Update on a computing machine running Microsoft WINDOWS® operating system. The manifest may specify components for a static and/or dynamic survey. On each computing device 230 receiving the manifest, applications 260 are surveyed for calls to components 241 of the operating system 240 identified in the manifest 250. When a call is found, an indication of the call may be recorded to a log file 270 as usage information which is processed into a report 271. The report 271 is provided to the management server 210 which aggregates and analyzes the reports from each of the computing device 230. In FIG. 2, four computing devices 230 are shown, however, the system 200 is not so limited. Usage information may be collected from any number of computing devices 230.

Management server 210 is any suitable type of computing device configured to provide a manifest 250 and analyze reports 271 received from the computing devices 230. Management server 210 has a processor 211 operably connected to a memory 212.

Processor 211 may be any suitable processing device such as, for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 212 may be integrated into processor 211 and/or may include "off-chip" memory that may be accessible to processor 211, for example, via a memory bus (not shown). Memory 212 may store software modules that when executed by processor 211 perform a desired function. Memory 212 may be any suitable type of computer-readable storage medium such as, for example and not limitation, RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, or other semiconductor devices, or other tangible computer storage medium.

Management server 210 also includes a network interface 213 for communicating over the network 220. Network interface 213 may be any suitable combination of hardware and software configured to communicate over the network 220. For example, the network interface 213 may be implemented as a network interface driver and a network interface card (NIC). The network interface driver may be configured to receive instructions from other components of management server 210 to perform operations with the NIC. The NIC provides a physical connection to network 220. The NIC is configured to generate and receive signals for communication over network 220.

The management server 210 may include computer executable software modules, each containing computer executable instructions. The software modules may be stored in memory 212 and executed by processor 211, though this is just an illustrative embodiment and other storage locations and execution means are possible. In some embodiments, the manifest providing module 214 and the report analysis module 215 may be implemented as computer executable modules. However, these components may be implemented using any suitable combination of hardware and/or software.

The manifest providing module 214 is configured to provide a manifest 250 to the computing devices 230. The manifest 250 may be received or generated by the manifest providing module 214 in any suitable way. For example, the manifest 250 may be obtained directly from developers of an operating system. The manifest providing module 214 may include tools for developers to select components 241 of the operating system 240 to be surveyed. Though, any suitable way of selecting components for the manifest may be used. Other characteristics of the manifest may also be obtained from the developers or generated in any other suitable way. For example, the developer may specify an expiration time for the manifest or other information about how the manifest is to be deployed.

Once components are selected, the manifest may be created by representing the selected components in any suitable way. In embodiments in which a static survey is desired, the manifest may include a dictionary of strings or other indications that a call to the component is likely written into an application. Other data representing the selected components, such as a GUID or file path, may also be included. This information may be formatted as an XML file or in any other suitable format for distribution.

Once the manifest 250 has been created, the manifest providing module 214 makes the manifest 250 available to the computing devices 230. The manifest providing module 214 may distribute the manifest 250 to the computing devices 230 over the network 220 in any suitable way. For example, in ways described at step 151 of method 150 (FIG. 1B).

The report analysis module 215 processes reports 271 received from computing devices 230. The reports 271 contain usage information for the components in the manifest as collected on the computing device 230 from which the report was received. The report analysis module 215 aggregates the reports 271 and performs any suitable type of analysis. For example, the analysis may provide information that is useful to the developers. In some embodiments, the reports 271 are aggregated in a database 216 which can be queried by the developers using known or other suitable querying techniques. The report analysis module 215 may perform a set of programmed queries of general interest to the developers. For example and not limitation, the report analysis module 215 may generate statistics indicating overall use of each component, use of components by a particular application, usage of components by machines that used the components, and statistics about how widely used or installed a particular application is. The statistical information generated by the report analysis module 215 may be provided to developers to assist them in assessing how to move the operating system platform forward in future releases. For example, the developers may use the information to identify components that are candidates for updating, replacement, or removal.

Manifests 250, reports 271 and general communications between the computing devices 230 and the management server 210 are performed over communications channels provided by the network 220. The network 220 provides a communication channel via any of the Internet, an extranet, an intranet, and the like. Network 220 may be any type or combination of wired or wireless networks. Examples of suitable networks include Personal Area Network (PAN), Local Area Network (LAN), Campus Area Network (CAN), Metropolitan Area Network (MAN), Wide Area Network (WAN), Global Area Network (GAN), and the like.

Any suitable communications protocol may be used by network 220. For example, the network 220 may support any of IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Protocol), SSH (Secure Shell Protocol), POP3 (Post Office Protocol 3), SMTP (Simple Mail Transfer Protocol), IMAP (Internet Message Access Protocol), and the like.

The computing device 230 may be any suitable type of computing device configured to collect and report usage information in accordance with a manifest. One of the computing devices 230 has been shown in detail in FIG. 2. Each computing device 230 may be similarly configured as the detailed computing device. Though, each computing device may be configured in any suitable way to collect and report usage information.

Computing device 230 has a processor 231 operably connected to a memory 232. Processor 231 may be any suitable processing device such as any of the examples provided for processor 211 of the management server 210. Memory 232 may be any suitable computer-readable storage medium such as any of the examples provided for memory 212 of the management device 210.

Computing device 230 also includes a network interface 233 for communicating over the network 220. The network interface 233 may be any suitable network interface and may be implemented, for example, in any of the ways described above for network interface 213 of the management server 210.

The computing device 230 may include computer executable software modules, each containing computer executable instructions. The software modules may be stored in memory 232, and executed by processor 212, though this is just an illustrative embodiment and other storage locations and execution means are possible. In some embodiments, the agent 234, static analyzer 235, application selection module 236, hooks 237, operating system (OS) 240, some or all of components 241, and applications 260 may be implemented as computer executable modules. However, these components may be implemented using any suitable combination of hardware and/or software.

OS 240 may provide functions for applications executing on computing device 230. In addition, OS 240 may manage the activities and sharing of resources of computing device 240. The OS 240 may provide various functions and manage the computing device through various components 241. Components 241 may include, for example and not limitation, dynamically linked libraries (e.g., a dynamic-link library), application programming interfaces (APIs), component object models (COMs), globally unique identifiers (GUID), registry keys, or any uniquely identifiable part of the operating system 240. In some embodiments, any of the agent 234, static analyzer 235, application selection module 236, or hooks 237 may be implemented as computer-executable components of OS 240.

The agent 234 is configured to obtain the manifest 250 from the management server 210. The agent 234 may query the management server 210 for status information on the manifest. For example, the agent may be configured to query the server 210 periodically, after a report 271 has been uploaded, or at any other suitable time. If the agent 234 determines the manifest available from the management server 210 is acceptable, it may initiate downloading the manifest. In some other embodiments, the server 210 provides an indication to the computing device 230 that a manifest 250 is available. The agent 234 confirms that the user has provided consent and accepts transfer of the manifest.

Regardless of how the manifest is obtained, it may be stored in a secure location in memory 232 until the agent 234 is ready to process the manifest. Rights to modify the contents of the secure location may be limited to administrative processes. Unprivileged processes may not be able to modify the manifest while it is in the secure location.

At a suitable time, the agent 234 begins processing the manifest 250. Processing prepares the manifest 250 for surveying applications for use of components identified by the manifest. The type of processing required, if any, may be implementation dependent. For example, the manifest may be transmitted to the computing device 230 in a compressed file format such as CAB, ZIP, RAR, or any other suitable type of file compression as is known in the art. The agent 234 may decompress the file.

The agent 234 may be configured to transform the manifest into a particular type of data structure. For example, the manifest may include a keyword dictionary. Components to be surveyed may be identified by one or more keyword strings in the keyword dictionary. The agent 234 may be configured to generate a trie structure from the keyword dictionary. A trie structure may be generated in any suitable way such as those known in the art.

As another example, the manifest may be processed to populate a data structure in registry. For example, in the MICROSOFT® WINDOWS® operating system environment the data structure may reside in HKEY_LOCAL_MACHINE (HKLM). Though, the data structure may be stored in any suitable registry or memory location.

The agent 234 may be configured to process the manifest at a time when the computing device 230 is idle. For example, the agent may process the manifest at night, or at times when the user is not using or unlikely to use the computing device. Alternatively or additionally, agent 234 may be configured to execute only in a low priority, "background," process such that it does not interfere with other processes on the computer. Though, idle times for processing the manifest 250 may be identified in any suitable way such as those known in the art.

In FIG. 2, the manifest 250, once processed by the agent 234, is represented by the processed manifest 251. It should be appreciated that in embodiments where the manifest is not processed, the manifest 251 may be unchanged with respect to manifest 250.

Once the manifest has been received and processed (if applicable) it may be used by one or more logging modules to survey applications 260 for use of the components identified in the manifest. In the embodiment illustrated in FIG. 2, the logging modules include the static analyzer 235, the application selection module 236 and the hooks 237. Though, surveying may be performed by any suitable type of logging module. The static analyzer 235 may facilitate statically surveying application files 261. Hooks 237 may facilitate dynamic surveying of applications 260 designated by the application selection module 235 for monitoring. In some embodiments, the manifest indicates the types of surveying that should be performed on the computing device.

Static analyzer 235 surveys applications by scanning application files 261 for calls to any of the components in the manifest 251. It provides broad coverage since calls to a component from the file 261 will be identified regardless of the frequency with which the particular call is made when the application is actually executed by the computing device 230. When a call to a component in the manifest is detected in the file 261, static analyzer 235 indicates a dependency of the file on the called component. Calls to a component may be explicit, by reference or through some other form of dependency.

Calls to operating system components may be identified in any suitable way. However, the inventors have recognized and appreciated that most system-level dependencies have some sort of relatively unique name identifier for the called components. Since the name of dependent components will generally appear in the application file, string scanning provides a reliable and thorough mechanism for surveying application files. In some embodiments, the static analyzer 235 scans the application file 261 for strings that match a keyword string in the manifest 251. When the static analyzer 235 identifies a match, an entry is recorded to a log file 270. Strings may be encoded, for example and not limitation, in compliance with the American National Standards Institute (ANSI), in Unicode, in binary, or using any suitable method of encoding strings. Any suitable rules for comparing strings may be used. For example, the comparison may be case-sensitive or case-insensitive. As another example, certain characters, such as newline, may be ignored. Further, additional information about a successful match may optionally be recorded, such as whether it is followed by a NULL character or whether it is in close proximity to another match within the file, which may be used to improve confidence in the fidelity of the match.

The processed manifest 251 may be stored or loaded into an appropriate accelerated data structure, such as a trie, to quickly match strings in the file 261 to keyword strings in the manifest. Though, the specific mechanism for storing information obtained from the manifest may depend on the manner in which a static survey is to be performed.

Static analyzer 235 may select application files 261 for scanning in any suitable way. For example, a file for scanning may be selected randomly from among files containing instructions for executing an application. Such files may be identified, for example, based on a file type extension. Because static analyzer 235 operates based on string matching, it may scan files without knowledge of the file formats or binary analysis. Though, in some embodiments, separate scan analyzers may be provided for application components represented in different file formats.

In some embodiments, features are incorporated to limit disruption to operation of computing device 230 from scanning. As one example, the manifest may include information specifying a probability that a file or category of files should be scanned, and files may be randomly selected in accordance with the specified probability. A low probability may be specified to reduce the computational impact on a given computing device. A high probability may be specified when more information is desired. When a probability a file will be scanned is defined for a particular file and the file is also part of a category of files for which a scanning probability has been defined, the file may be randomly selected for scanning according to the file specific probability. Though, any suitable way of choosing the scanning probability may be used. Alternatively or additionally, static analyzer 235 may be implemented as an idle task. It may be limited to running only while the computing system is idle. For example, when the computing system is not being used by the user.

In addition to or as an alternative to static surveying, dynamic surveying may be performed on the computing device 230. Dynamic surveying is performed by monitoring applications selected by the application selection module 236 for calls to components identified in the manifest 250. For each selected application, hooks 237 are introduced between the process in which the application is executing and the operating system 240. Hooks 237 are a set of computer executable instructions that mimics the interface the operating system presents to the application. The hook 237 inspects calls from the process executing the application to the operating system to determine if they are to components of the operating system that the manifest 251 specifies. For example, the manifest 251 may indicate calls to component 241A of the OS 240 are to be logged but not calls to component 241B of the OS 240. Accordingly, the hooks 237 may record a log entry into a log file 270 when a call 280A to component 241A is identified and may simply ignore a call 280B to component 241B.

The application selection module 236 may select an application to be monitored in any suitable way. For example, the application selection module 236 may determine whether to select an application for monitoring when the application is being launched. In some embodiments, applications are selected randomly with a probability specified in the manifest. For example, when an application is being launched the application selection module 236 may generate a random number and compare it to a probability value specified by the manifest. If the random number is less than the probability value, the application is selected for monitoring. If an application is not selected for monitoring, no hooks are applied (or less optimally, hooks may be applied but no usage is logged). Application selection module 236 may be implemented in any suitable way. For example, code in the application startup path may read the sample rate from the manifest in registry and make a determination whether or not to sample the application.

For some embodiments, existing components in the operating systems may be used to implement the selection of an application for monitoring. For example, in the MICROSOFT® WINDOWS® operating system environment, the application selection module 236 may be implemented using a hooking mechanism or shim engine component of the OS. Though, any suitable component, such as those known in the art, may be used.

In some embodiments, the application selection module 236 excludes certain applications from being surveyed. For example, digital rights management (DRM), copy protected or system protected processes that fail when hooks are injected may be excluded. Processes that start before the application selection module 236 is initialized may also be excluded. In some embodiments, processes that are part of the operating system 240 (i.e., system processes) or processes identified in the manifest are also excluded.

Hooks 237 compare calls from their respective processes to the manifest 251. If a match is identified, that hook 237 records information about the process and/or the application the process is executing, and about the matching component. In the embodiment illustrated, information is recorded by making an entry in a log file 270, but any suitable mechanism for recording information may be used. For example, the full path of the application, the GUID associated with the component, and the file ID and/or program ID may be written to the log file 270.

A file ID may be a value identifying the file calling the component. One way to generate a file ID is to hash of all the bits in the file, though a file ID may be generated in any suitable way. A program ID may be a value identifying a program. This value may be useful when programs are distributed in multiple files. One way to generate a program ID is to compute a hash of metadata in a file from which the program the file is associated with can be identified. This metadata may include the application name, version number and/or other information. However, a program ID may be generated in any suitable way. Though, information identifying a component may be in any suitable format. As a specific example, if the component is a dynamically linked library (DLL), the DLL name may be recorded instead of a GUID.

In some embodiments, existing services, such as for error logging and for providing warning and informational messages, may be leveraged by the hook 237 to collect the information written to the log file 270. For example, the hook 237 may specify a hook or instrumentation point to an error logging service which then gathers the appropriate usage information. For example, in the MICROSOFT® WINDOWS® operating system environment event tracing for Windows (ETW) may be used to collect information for the log entry.

The log files 270 may be stored in any suitable location in memory. In some embodiments, the log file 270 is a private file which may receive log entries from the static analyzer 235 or hooks 237, but may only be processed by the agent 234. The log file may be a predetermined size, such as 100 MB. If the log file is full, the oldest log entries may be replaced with the newest log entries using the first-in, first out (FIFO) method. Though, any suitable policy may be used to log entries after the log file is full. The log file size may be specified by the manifest. In some embodiments, separate and/or multiple log files are used for each type of survey being performed. For example, dynamic surveys and static surveys may be recorded to different log files.

During or after the survey processes, the agent 234 may optionally be configured to process the log files 270 to prepare a report 271 for the management server 210. The report 271 may be a compact form of the usage information recorded in the log files 270. For example, the agent 234 may sample the log files, eliminate redundant or unreliable information from the log files, or process the log files 270 in any suitable way to produce the report 271. The report may be prepared in any suitable format, which may or may not be human-readable.

Once the report 271 is complete, the agent 234 may instruct the network interface 233 to send the report 271 to the management server 210. If the log file was not processed to prepare a report, the log file itself may be sent. In some embodiments separate and/or multiple reports are created for each type of survey being performed.

Figure 3:
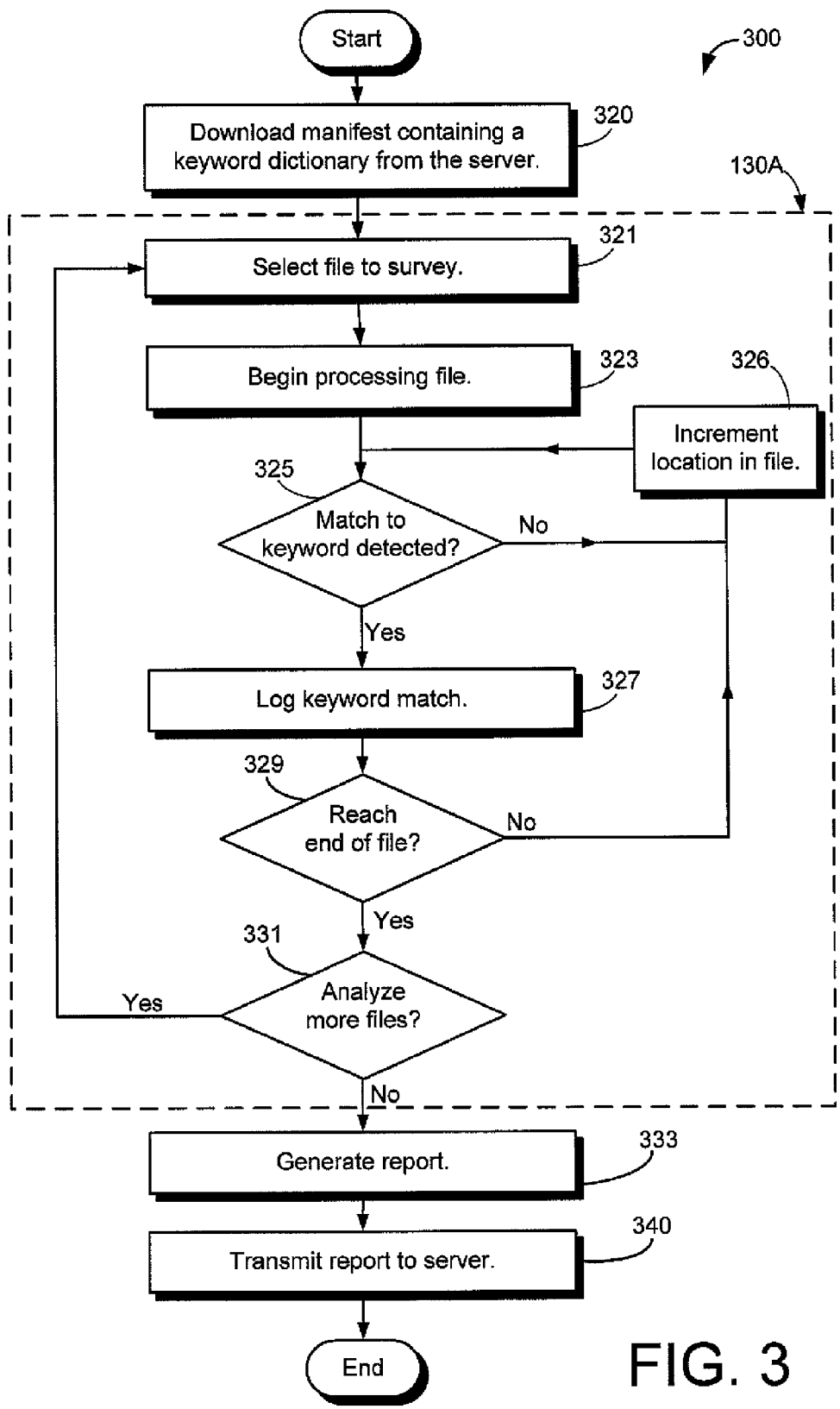
FIG. 3 is a flow chart of a method for statically surveying applications on a computing device for calls to components of an operating system specified in a manifest according to some embodiments.

A method 300 for performing a static survey is described with reference to FIG. 3. Method 300 may be performed on a computing device, such as one of the computing devices 230 in FIG. 2, once user consent has been obtained.

At step 320, a manifest is downloaded from the management server. The method 300 may determine if the manifest has expired and if so repeat the download step or abort the method. Likewise, if no manifest is available from the management server, a manifest stored on the computing device may be used, an alternative server may be contacted, or no usage surveys may be performed on the computing device. Though, any suitable contingency plan may be performed if a manifest is unavailable. The manifest includes a keyword dictionary containing keyword strings that may be used to identify some of the components of the operating system of the computing device. The keyword dictionary in an example embodiment may have about 100,000 keyword strings and take up about 2 MB of space. In some embodiments, the manifest may only indicate changes (deltas) from a reference dictionary stored on the computing device. The keyword dictionary may be generated by applying the deltas from the manifest to the reference dictionary. In some embodiments, the reference dictionary may itself be downloaded from a server. Though, other implementations are possible, including providing the reference dictionary with an application when the application is installed on a computing device. The keyword dictionary may be processed to improve the speed and/or efficiency at which usage information is collected at step 130A. For example, the keywords may be organized into a trie.

In some embodiments the keyword dictionary contains multiple keyword strings to identify a single component. Each string may individually identify the component or a group of several strings may be required to identify the component. In the later case, each of the keyword strings may be referred to as a "fragment." Breaking a long string into fragments may be useful for parsing registry, file, or web paths into manageable string sizes. This is particularly true when a path is not required to be contiguous in an application file, but may be found in several disjoint pieces. By breaking up a path into individual path elements, a path broken into one or more disjoint pieces may be identified in an application file. For example, when all of the constituent fragments have been matched in a file, suitable logic may be used to determine if the identified fragments collectively represent the path.

At step 321, a file is selected to survey. The file may be selected from a pool of files, each containing computer-executable instructions for an application. Files may be selected from among the pool in any suitable way, for example, sequentially or randomly. In some embodiments, the manifest contains a probability for determining if a file or category of files should be scanned. As each file is processed, a random number may be generated, for example between zero and one, and compared to the probability in the manifest to determine if the file is selected. If the file is not selected, another random number may be generated to determine if a different file should be scanned. The method may proceed through the pool of available files until a file is identified. If a file is not identified at step 321, the method 300 ends. In some embodiments, the system may keep track of which files have been previously sampled and may be configured to only sample files that have never been sampled or have been updated since they were last sampled. The system may keep track, for example, until a new manifest is being used.

Provided a file is selected in step 321, at step 323 the process of scanning the file begins. Any suitable preparation of the file may be performed. For example, the file may be read into a temporary memory location.

The file may be scanned according at steps 325, 326, 327 and 329 until the end of the file is reached. Though, the scanning technique used is not critical to the invention and any suitable algorithm may be used to scan for keywords. In some embodiments, the method 300 begins scanning from the beginning of the file looking for matches in the keyword string. Any suitable algorithm, such as those known in the art, may be used to search the file for keyword strings. For example, each character in the file may treated as a potential first character in a keyword string. Thus a character string may be traced through the trie until a keyword is matched or the characters in the file can no longer match the characters in the trie.

At step 325, as the file is being processed, determinations are made if a keyword has been detected. For example, a keyword in the trie may be matched, or a string in the file may not correspond to any of the keyword strings in the trie.

If at step 325 a keyword has not been detected, the method increments the location in the file being scanned at step 326. For example, a current position in the file may be incremented to the next potential lead character. The process then iterates back to step 325 to determine if the string at the new position corresponds to a keyword.

If at step 235 a keyword is detected, for example, by matching a string to a keyword in the trie, the process continues to step 327. At step 327, the keyword match is recorded to a log file or other suitable location. The log may provide an indication of the keyword matched and the file for which the match occurred. In some embodiments, for a given application file, only the first time a particular keyword string is match is recorded. That is, the record only indicates whether a keyword string had a match, but not the number of times the match occurred in a single application file. In some other embodiments, each keyword match is logged and techniques to compress the log are performed when the report is generated (step 333).

In some embodiments, keyword matches are recorded with metadata in the log. The metadata may provide a pointer into the scanned file specifying a point in the string, specify the proximity to other keyword matches in the file, whether the string is lead and/or followed by a delimiter, whether the string is adjacent to text in the file, or provide any other information about the context of the keyword match. The metadata may be used to improve confidence in the fidelity of the match.

At step 329, if the entire file has not been scanned, the process increments the position in the file (step 326) and continues scanning for keyword strings as described above. If the entire file has been scanned and the end of the file is reached, the method continues to step 331.

At step 331, the method determines if more files are to be analyzed. Whether more files are to be analyzed may be determined in any suitable way. For example, if files are being chosen with a probability specified in the manifest and there are files that have not yet been considered, the process may return to step 321. The decision at step 331 may be determined in any suitable way. For example, the determination may consider whether an amount of time has elapsed, whether a certain number of files have been scanned, whether all files have been considered, whether an upper limit on the amount of data collected at once is reached, or based on any other event or combination of events. If at step 331 it is determined to continue scanning more files, method 300 loops back to step 321. Otherwise the method proceeds to step 333.

At step 333, a report is generated. A report may be generated to reduce the size of the log files or draw logical conclusions from the log entries. The report may be generated in XML or any other suitable file format.

To generate the report, the log files may be analyzed in any suitable way. This analysis may be performed on the computing device before generating the report or on the server after receiving the logs. In some embodiments, the log entries are analyzed for possible false positives. The risk of false positives may be assessed for individual keyword strings using, for example and not limitation, a natural language dictionary, n-gram models trained on binary files, and/or document corpus scans. For keyword strings that are likely to produce false positives, parent-child dependencies may be verified. For example, if a particular API name was detected an associated dynamic-link library (DLL) name is expected for true positives. If the DLL name was not found, the API name may be discredited.

In some embodiments, the log entries are compressed to indicate only which keyword strings were matched. The log may be compressed into a small report by reporting only matches, encoding matches as a bit vector over dictionary ordinal, and applying a suitable compression to the result. Also metadata may be encoded as compressed bit vectors over the matches. Keyword matches may be combined across individual file or multiple files. For example, all keywords string matches for files related to a single application may be combined into a single list of matched keyword strings.

In some embodiments, at step 333 fragments are combined using information provided in the manifest and logged metadata. For example, the manifest may additionally contain information about how to recombine the fragments and determine if the full path was present.

At step 340 the report is transmitted to the server.

Figure 4:
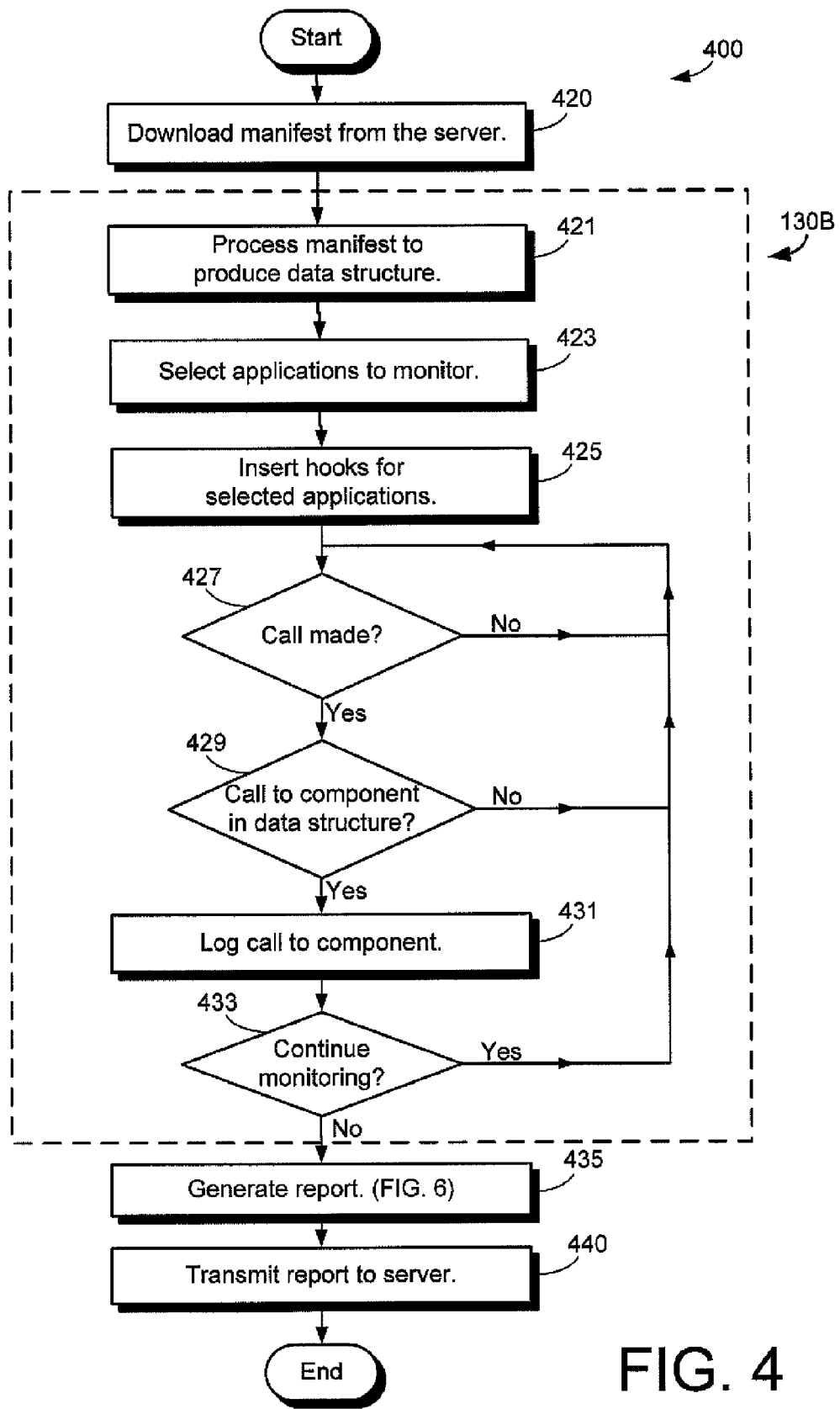
FIG. 4 is a flow chart of a method for dynamically identifying and reporting calls from processes executing on a computing device to components included in a manifest according to some embodiments.

Surveying may also be performed dynamically on processes executing applications. Dynamic surveys may be used to collect usage information about which executing applications have called components specified in the manifest and a frequency at which those calls are made. Method 400, shown in FIG. 4, is a process for performing a dynamic or "runtime" survey of component use by executing applications. Method 400 may be performed on a computing device, such as one of the computing device 230 in FIG. 2, once user consent has been obtained.

At step 420 a manifest is downloaded. The method may determine if the manifest has expired and if so follow a suitable contingency. For example, the method may repeat the download step, download a manifest from an alternative server, use an unexpired saved manifest, or end the method. The manifest specifies components and/or categories of components of the operating system to be surveyed. For example, files, APIs, DLLs or any other type of uniquely identifiable component may be specified in the manifest. In some embodiments, the components are associated with globally unique identifiers (GUIDs) for identification purposes. The manifest may be stored in a secure location in the memory of the computing device. Once the manifest has been downloaded to the computing device, it may be immediately available for processing. In some embodiments, restarting the computing device is not required.

Steps 421 through 433 may represent some embodiments of step 130A of method 100 (FIG. 1A).

At step 421, the manifest is processed to produce a data structure. For example, the manifest may be used to populate a data structure in the registry of the computing device.

Step 421 may be implemented as a low priority or background process. Processing the manifest may be delayed until the computing device is idle or until a predetermined time. For example, step 421 may be initiated automatically at night or when a user is not working at the computing device.

In some embodiments, the manifest is downloaded in an appropriate format and may be directly written to an appropriate place in memory. If so, step 421 may be optionally skipped.

At step 423, applications are selected for monitoring. Applications may be selected in any suitable way. In some embodiments, when an application is being launched, a determination is made as to whether the application will be monitored. For example, applications may be selected randomly with a probability specified by the manifest. In an example embodiment, about 1 to 5 percent of applications are monitored. Launching applications may be randomly selected for sampling until, for example, the manifest is removed from the registry or the manifest has expired. In some embodiments only non-system processes are considered for monitoring. For example, applications that may be running on the computing device. In some embodiments, system processes, that are processes associated with the operating system, are not monitored by default. The manifest may specify for each component or category whether system and/or non-system processes are to be monitored. In some embodiments, the application selection module 236 (FIG. 2) may be used to select applications for monitoring at step 423.

At step 425, hooks are inserted between the selected applications and the operating system. In some embodiments, the selected applications are parent processes and a hook is applied to the corresponding child process when it loads. Each parent process is configured to pass information to a child process to which a hook has been applied. In some embodiments, a single hook may be inserted to monitor multiple processes. Similarly, multiple hooks may be applied to a single process. For example, multiple hooks may be used to monitor calls from an application to a category of components. When a hooked process starts up, general information about the hooked process may be recorded to a log file. A suitable ID may be generated and recorded so that log entries may subsequently reference this general information, reducing the amount of information logged with each entry. For example, an image header hash may be generated. A log entry may also be recorded when the process terminates. In some embodiments, the application selection module 236 (FIG. 2) may be configured to perform step 425.

For each selected process, the inserted hooks perform steps 427, 429 and 431.

In some embodiments, monitoring may be selectively performed only during some intervals of time to reduce processing burden on each computing device. To provide selective monitoring, the hook may be intermittently enabled. For example, the hook may be enabled to monitor for calls a certain percentage of the time such as 5 or 10 percent. Any suitable way of intermittently enabling and disabling the hook may be used.

At step 427, a selected process is monitored by hooks for calls. When a call is received by a hook from the process it is monitoring, the process proceeds to step 429.

At step 429, the call is inspected to determine if it is a call to a component in the manifest. The component may be in the manifest either explicitly or as part of a category of components. The hooks may determine if the call is to such a component by retrieving the data structure produced in step 421. If the call is not to a component in the manifest, the method loops back to step 427 to monitor the process for subsequent calls.

In some embodiments, steps 427 and step 429 may be performed simultaneously. For example, the hook may be configured to inherently ignore calls that are to components other than those specified in the manifest. Also, multithreading may enable multiple hooks to be running at the same time.

If the call is to a component in the manifest, the method proceeds to step 431 where the call is logged. Information about the process and about the called component may be recorded as a log entry in a log file. In some embodiments, the log entry may reference additional information about the process previously recorded to the log file. For example, with each log entry an image header hash for the module may be generated at runtime and recorded as part of the log entry. The image header hash may be used to subsequently identify other log entries for the module in the log file.

In some embodiments, the log entry may include stacks and traces to where modules are loaded in the process. This information may enable a call to be associated with a module loaded by the process being monitored. For example, a video codec loaded by a media player. Additionally or alternatively, log entries may be recorded as modules are loaded/unloaded.

The information for inclusion in a log entry may be collected using hooks, instrumentation points, or any other suitable techniques and/or components such as those known in the art. For example, in the MICROSOFT® WINDOWS® operating system environment, event tracing for Windows (ETW) may be used to collect information for a log entry. Though, the information may be collected in any suitable way.

At step 433, a decision is made whether monitoring should be continued. Whether to continue monitoring may be determined in any suitable way. For example, monitoring may stop when a time limit has been met, a trigger from a management server is received, all the processes being monitored may have terminated, or based on any other event or combination of events. Though, it should be appreciated that FIG. 4 shows process steps ordered sequentially for simplicity. Some or all of the illustrated steps may be performed in parallel or may be performed independently. As a specific example, in some embodiments, monitoring is decoupled from report generation (step 435). As a result, a report may be generated even though selected processes continue to be monitored until they are terminated.

At step 435 a report is generated. The report may be generated in a way similar to that described for step 333 of method 300 (FIG. 3). Though, any other suitable way may be used. In some embodiments, the report may be generated, at least in part, according to method 600, which is subsequently described with reference to FIG. 6. The report may be generated in XML or any other suitable file format.

In some embodiments when generating the report, the stack recorded in a log entry may be walked to the first non-system process. In this way when an application calls into a component which in turn calls into another component, the later of which is being monitored, it can be determined that the application is not directly depending on the monitored component.

At step 440 the report is transmitted to the server.

In some embodiments, reports are continuously generated (step 435) and sent back (step 440) to the management server. For example, after a predetermined time or after a certain number of events have been logged, a report may be generated, although logging may continue.

In some embodiments, an upload limit may be placed on how much data may be reported back to the management server. If an upload limit is reached, the method discontinues reporting usage information for a period of time or may report it at a lower rate. The period of time and/or rate may be determined in any suitable way. For example, they may be specified by the management server or manifest. In some embodiments, the surveying process may be halted and/or the probability a particular application or process is selected for surveying may be reduced.

It should be appreciated that some of the processes described in methods 300 and 400 for generating the report from the log file may be performed by the management server after the report has been upload. Whenever a particular type of processing may be performed on the computing device while generating the log file or on the management server as part of aggregation and analysis, it is not critical where processing occurs.

Also, it should be appreciated that FIG. 4 illustrates an embodiment of dynamic monitoring in which instrumentation is achieved by inserting a hook between a an application process and the operating system. Other embodiments are possible. For example, monitoring may be performed by adding instrumentation points to the code of the application. In such an embodiment, the logging performed in block 431 would be the result of the added code being executed.

Figure 5:
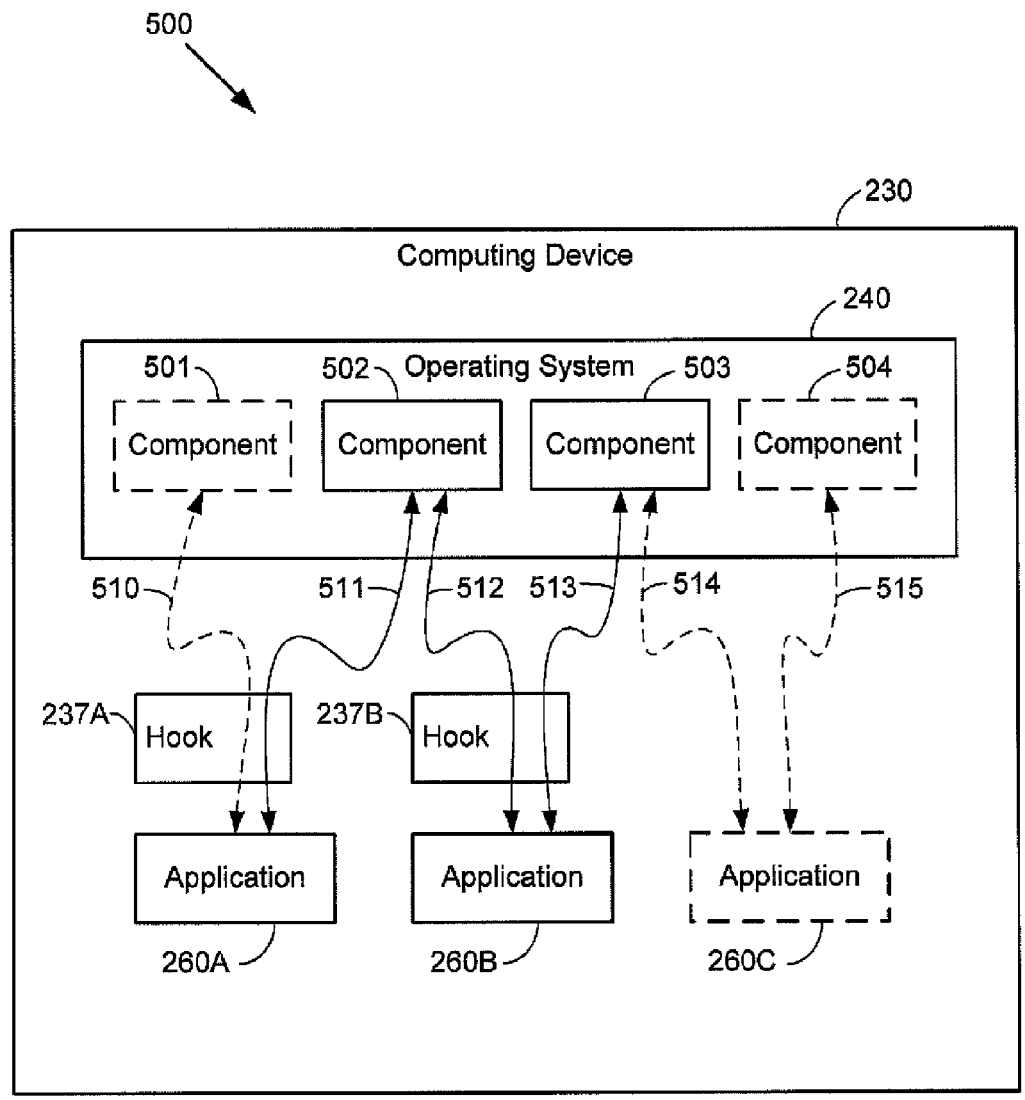
FIG. 5 is a block diagram illustrating the use of hooks for dynamically surveying component use on a computing device according to some embodiments.

FIG. 5 is a block diagram of a computing device 230 illustrating an example scenario 500 for method 400. In the figure, applications 260A and 260B are executing or processes that have been selected for monitoring and hooks 237A and 237B have been inserted between those processes and the OS (see steps 423 and 425). Application 260C, however has not been selected, and accordingly, a hook has not been inserted between this application and the operating system 240.

Also in the example scenario 500, components 502 and 503 are specified in the manifest. Components 501 and 504, however, have not been specified in the manifest. Specified components 502 and 503 are indicated by solid boxes and components 501 and 503 are indicated by dashed boxes.

When application 260A makes a call 510 to component 501, the hook 237A may inspect the call 510 but determine to ignore it. The call 510 does not need to be logged because it is to a component that has not been specified in the manifest either explicitly or by a category, or has been specified as a component, either individually or by category, not to be monitored.

When application 260A makes a call 511, however, the hook 237A will determine the call 511 is to be logged since it is to a component specified in the manifest or chosen based on the random sampling rate for the category. Similarly, calls 512 and 513 from application 260B are inspected and logged by the hook 237B because both calls are to components specified in the manifest.

Because application 260C was not selected for monitoring, calls 514 and 515 are not inspected by a hook. Accordingly, both calls to components in the manifest and calls to components that are not specified in the manifest are not logged.

Figure 6:
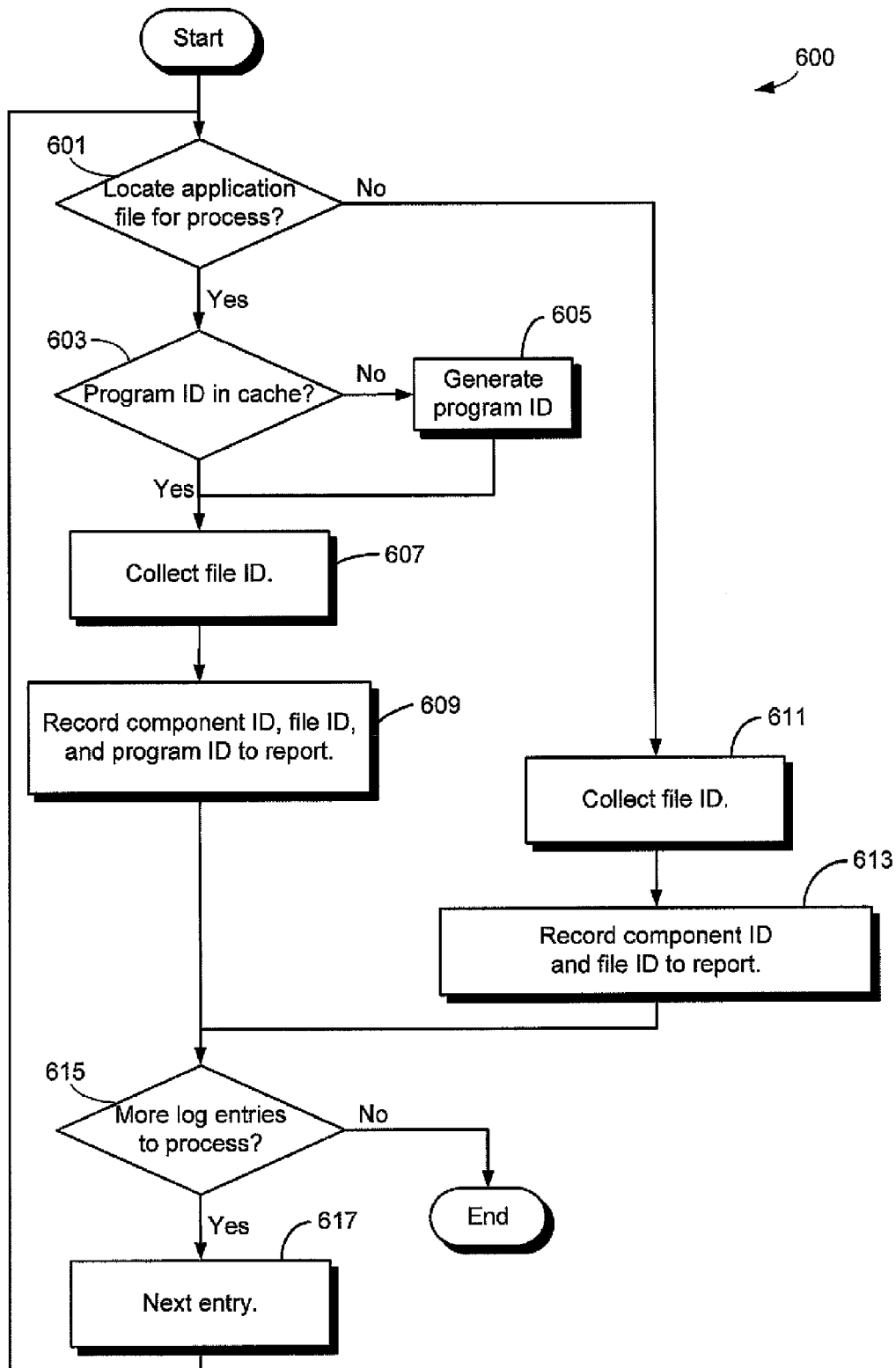
FIG. 6 is a flow chart of a method for generating a report of the use of components in the manifest according to some embodiments.

Method 600, shown in FIG. 6, is a method for processing a log file of a dynamic survey to generate a report according to some embodiments. It should be appreciated that method 600 is just one example of a method of generating a report. In some embodiments, generating a report may simply entail formatting the entire log file, or selected portions of it, for communication to a location, such as a networked server, where it may be analyzed, alone or in combination with reports from other computing devices.

Method 600 may be iterated for each of the entries in the log file. In some other embodiments, the log file may be sampled such that only a subset of the log entries is processed by method 600. The log entries may be selected in any suitable way. For example, log entries may be selected randomly. Log entries identified for processing by method 600 may be processed in any suitable order.

Further, the log may contain information other than samples indicating that an event occurred as a result of execution of a specific component to be monitored. A log file, for example, may contain data on a process sampled-in, you may have information on modules loaded into the process, notification when a process ends, etc. Though not expressly shown in FIG. 6, processing of the log file may include placing such data into data structures or otherwise organizing this information to assist when processing sampling entries.

At step 601, the application file for the process associated with the current entry is located. The process may be located using information stored in the log entry. If the application file is located, the method proceeds to step 603.

At step 603, the program ID cache is searched for the program ID and file ID associated with the application. If the IDs are not in the cache, the process proceeds to step 605 where a program ID is generated in any suitable way. For example, an ID generated at run time for the application may be used. In some embodiments, the image header hash generated for cross referencing entries in a log file may be used or converted to an appropriate ID. The image header hash may also be used to determine if the application has been updated between the time the log entry was made and the log file is processed.

After a program ID has been found or generated, the method proceeds to step 607 where the file ID is collected. The file ID may be defined by the program ID specification.

At step 609, the component ID, file ID, and program ID are recorded to the report.

If at step 601 the application file is not located, the method proceeds to step 611 where the file ID is collected. The file ID may be collected in ways similar to step 607.

The method then proceeds to step 613 where the component ID and the file ID are recorded to the report.

After steps 609 and 613, the process proceeds to step 615 where a determination is made as to whether additional log entries are to be processed. If not, the method 600 ends. Otherwise, the method continues to step 617.

At step 617, the next entry to be processed becomes the current entry and the process reiterates from step 601.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Though embodiments were described with reference to operating systems platforms, other embodiments may be directed to any application for which independent developers write and distribute code or plug-ins. For example and not limitation, embodiments may be directed to web browser, macro-extensible office applications, semantic features of document processing applications and document formats. Further, though monitoring is described to be based on calls from applications, it should be appreciated that the monitored calls could be initiated from any program or program component.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A memory storage device comprising computer-executable modules, each module, when executed by a computing device, configured to perform a respective function, the modules on the computing device comprising:
    an agent module that obtains a manifest of calls to components of an operating system, the manifest comprising indicia of strings of the calls, the manifest received from a data reporting service via a network;
    a logging module that searches for invocations of the calls by scanning executable application files stored in the memory storage device and using the indicia of strings to find invocations of the calls in the executable application files, wherein the logging module identifies applications executing on the computing device and creates hooks for the executing applications, the hooks configured to detect invocations of the calls from the executing applications, wherein each found and/or detected invocation is logged in a log file;
    a report generation module that generates a report of the identified and/or detected calls from the log file, the report indicating how many calls were found for respective ones of the components; and
    a report delivery module that transmits the report over the network to the data reporting service.

2. The memory storage device of claim 1, wherein the indicia comprises a keyword dictionary and the logging module identifies invocations of the calls by matching portions of the executable application files to entries in the keyword dictionary.

3. The memory storage device of claim 1, wherein the logging module creates a record for each call invocation detected by the hooks, each record comprising an indication of a corresponding executing application and a corresponding call invoked.

4. The memory storage device of claim 1, wherein the agent module populates a data structure stored in a registry of the computing device with identifiers for components in the manifest.

5. The memory storage device of claim 1, wherein the logging module dynamically surveys an executing application or process for calls to any of the components specified in the manifest.

6. A method performed by a computing device comprising acts of:
   downloading manifest data specifying strings of respective components of an operating system of a computing device, the components invocable through system calls of the operating system;
   executing an agent on the computing device, the agent reading the manifest data specifying the strings of the respective components of the operating system, the manifest data received from a data reporting service via a network;
   determining, by the agent, programs installed on the computing device to be surveyed;
   searching executable files of the determined programs for occurrences of calls to any of the strings in the manifest data, and when a call is found recording an indication of use of the corresponding component;
   inserting a hook between the determined programs and the operating system to inspect calls from the determined programs to the one or more specified components:
   wherein the searching and inspecting also logs to a log file occurrences of the calls; and
   sending a report to the data reporting service, the report comprising information derived from the log file indicating how many occurrences and/or invocations of respective ones of the components were found by the searching and inspecting.

7. The method of claim 6, further performed in part by the data reporting service, the method further comprising acts of:
   at the data reporting service, aggregating a plurality of reports from a plurality of computing devices, the report and the computing device among the plurality of reports and the plurality of computing devices, respectively; and
   generating usage statistics from the plurality of reports for the one or more components.

8. The method of claim 6, wherein:
   the manifest data comprises a plurality of keyword strings for identifying the one or more components;
   the determining by the agent comprises randomly selecting the programs.

9. The method of claim 6, wherein the indication of use comprises an identifier of the corresponding program and/or an identifier of the corresponding component.

10. A computing device running an operating system, the computing device comprising:
    a storage device storing a manifest and a plurality of applications including a first application and a second application, each application having computer-executable instructions, the manifest received from a data reporting service via a network, the manifest comprising strings of system calls to components of the operating system;
    a processor that executes the first application;
    a dynamic monitoring module comprising a shim between the operating system and the first application that intercepts calls from the first application during execution of the first application, the dynamic monitoring module determining which intercepted calls to log by comparing the intercepted calls with the strings, and recording a log entry identifying the corresponding component each time an intercepted call is determined to match one of the strings;
    a static scanning module that scans an application file associated with the second application for strings contained in the manifest and, when one of the strings is identified in the application file, records a log entry identifying the corresponding component;
    an agent module that generates a report using the log entries; and
    a network interface that receives the manifest from the data reporting service and transmits the report to the data reporting service, the report indicating counts of occurrences of the calls detected by the dynamic monitoring and static scanning modules.

11. The computing device of claim 10, further comprising:
    an application selection module that randomly selects the first application for monitoring and assigns the dynamic monitoring module to the first application.

12. The computing device of claim 10, wherein the agent module determines if the manifest has expired.

13. The computing device of claim 10, wherein:
    the agent module generates the report from only a subset of the log entries.

14. The computing device of claim 10, wherein the dynamic monitoring module records in a log entry a trace of where intercepted calls are made in the first application.

* * * * *